UNITED STATES PATENT OFFICE.

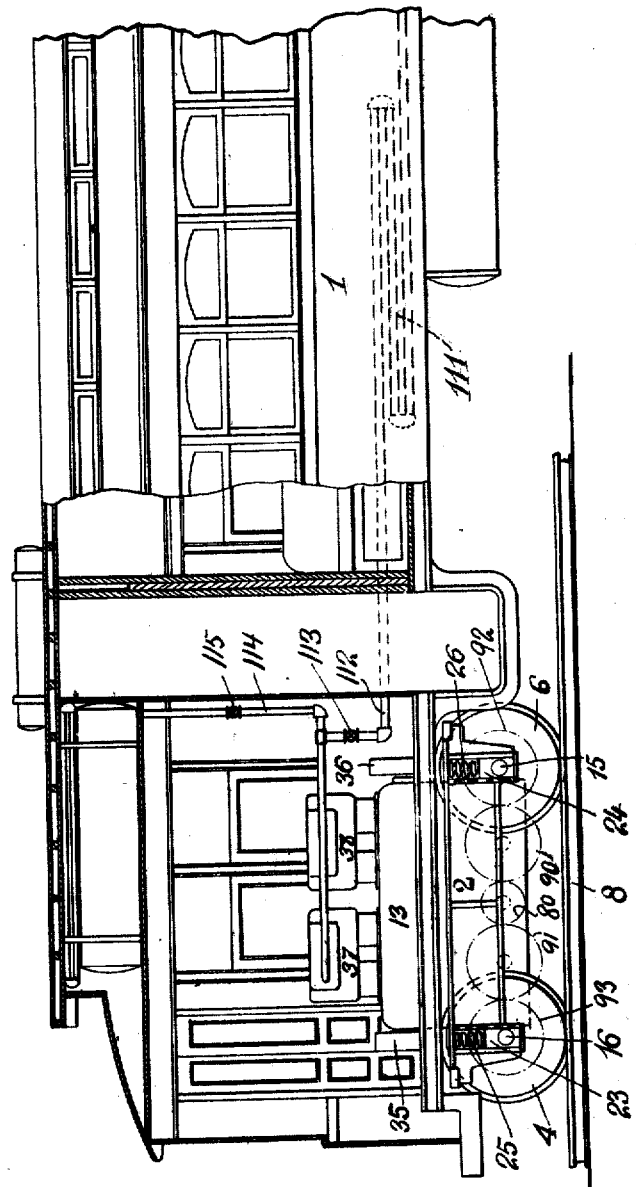

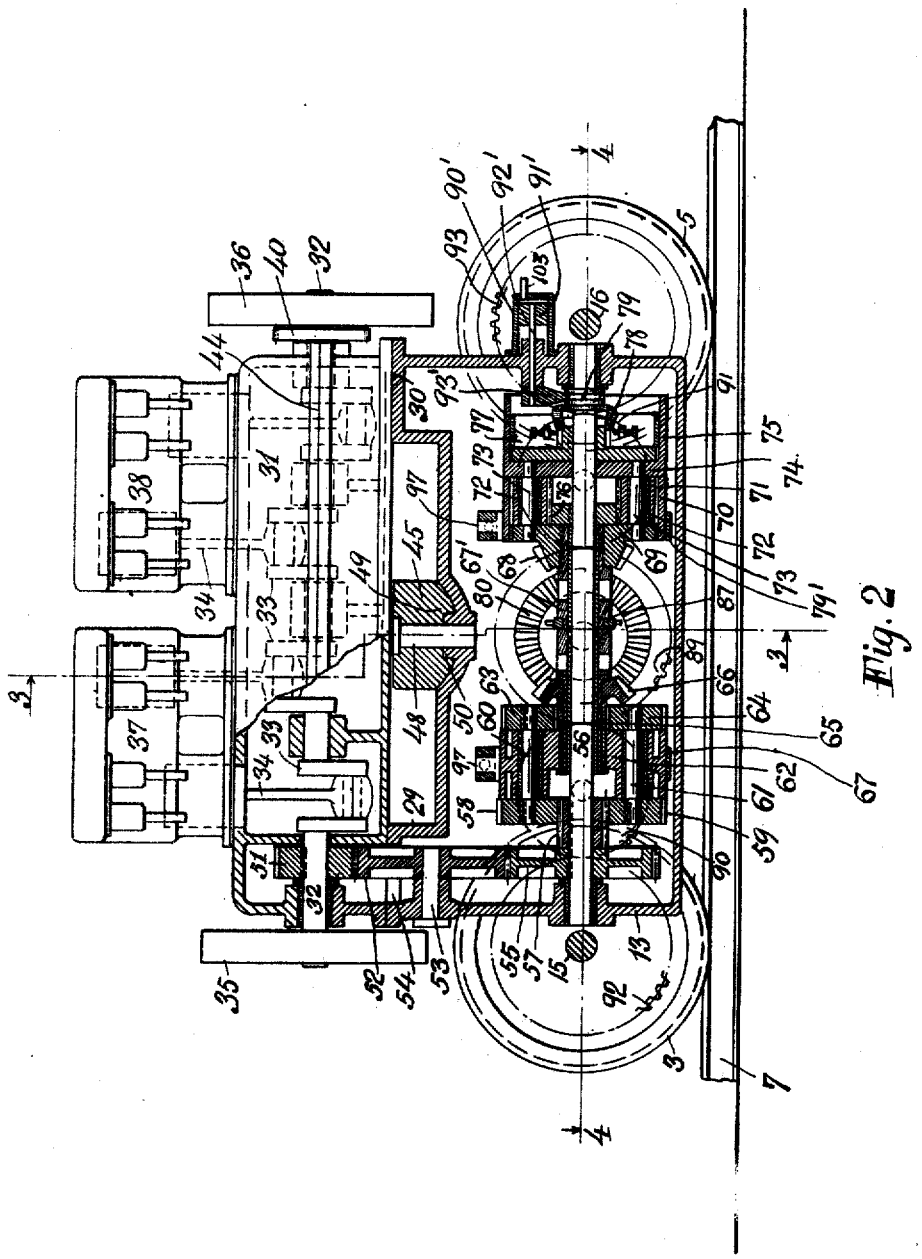

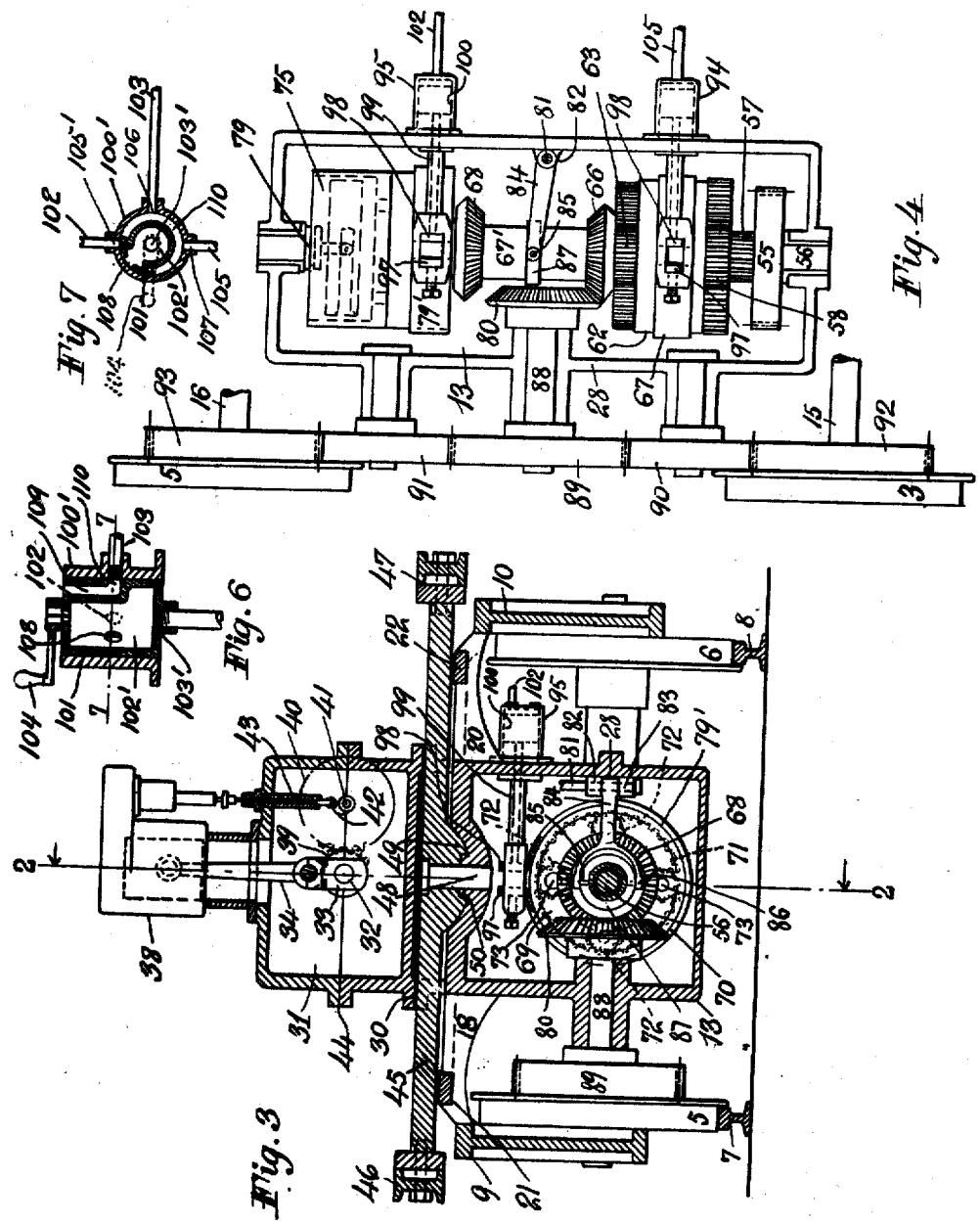

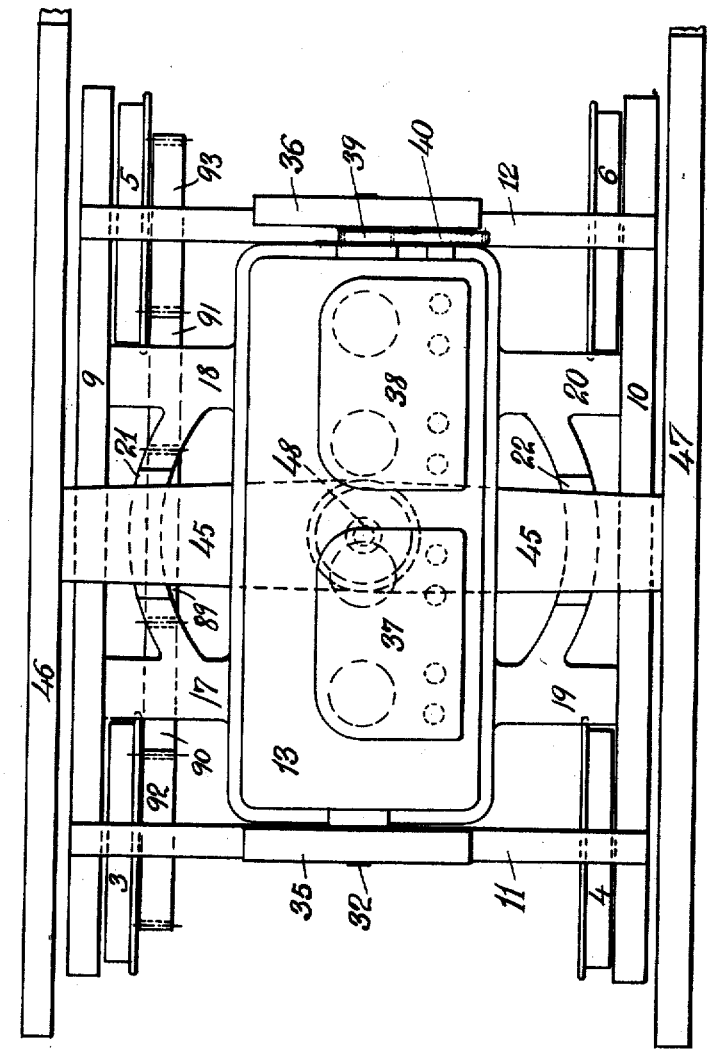

HIRAM P. HALL, OF NEW YORK, N. Y.

EXPLOSION-ENGINE-DRIVEN VEHICLE.

1,004,164.  Specification of Letters Patent.  Patented Sept. 26, 1911.

Application filed April 7, 1909. Serial No. 488,345.

*To all whom it may concern:*

Be it known that I, HIRAM P. HALL, a citizen of the United States, residing at New York, in the county of New York and State of New York, have invented certain new and useful Improvements in Explosion-Engine-Driven Vehicles, of which the following is a full, clear, and exact specification.

This invention relates to self-propelled vehicles, and more particularly has reference to vehicles driven by an explosive engine together with speed regulating and controlling means, whereby the entire driving mechanism including the engine and speed transmission will be mounted directly upon the truck, thereby leaving the car-body free and unobstructed.

While it has been proposed to drive vehicles by means of gas engines, in so far as I am aware, the propelling engine has been mounted upon the car-body, and various flexible driving connections have been provided between the engine and the truck, capable of permitting the necessary relative movement in order to go around curves. Such systems have also had the disadvantage of requiring a considerable proportion of available space in the car-body for the engine compartment.

According to this invention I propose to mount an explosive engine directly upon the truck in combination with speed regulating and controlling means located between the engine and the wheels, and capable of being controlled by the driver from the car-body. In such an arrangement it would be impracticable to employ systems of levers for securing the various speed and direction changes on account of their complexity, furthermore the use of sliding gear transmissions is objectionable because the strain and shock incident to starting, reversing and varying the speed of a heavy vehicle would be likely to break the gears or other parts. Furthermore, it is desirable that the motions required to effect the ordinary starting, stopping and reversing of the vehicle be simple, and that the operator be required to pay attention to as few controlling devices as is absolutely necessary. In carrying out this feature of the invention I have provided a system of fluid pressure speed control whereby the speed and direction of the car can be determined by a single lever, analogous to the controller of an electric car, and the braking effected by another lever. Thus rendering the control as simple as an electric car and also enabling the speed changes to be effected without shock or excessive strain on the mechanism.

In carrying out the invention I mount the variable speed transmission at the lower portion of the truck between the wheels and suitably inclosed in a protecting casing, while the driving engine is mounted upon the variable speed compartment and separately inclosed, the intervening space being utilized to carry a body bolster which supports the car-body thereby requiring a minimum amount of space. The speed changing mechanism herein described comprises a planetary transmission having three speeds in each direction controlled by friction devices through fluid pressure connections leading to the controller, which latter consists of a simple valve.

The invention will be more fully understood in connection with the description of the accompanying drawings wherein—

Figure 1, is a view partly in side elevation, and partly in longitudinal section, of a car, a portion of which is broken away. Fig. 2, is a partial section on the line 2—2 of Fig. 3. Fig. 3, is a transverse section on the line 3—3 of Fig. 2, looking in the direction of the arrows. Fig. 4, is a section on the line 4—4 of Fig. 2, looking in the direction of the arrows. Fig. 5, is a top plan view of the apparatus shown in Figs. 2, 3 and 4, showing the relations of the car sills to the truck, engine and gearing. Fig. 6, is a vertical section of a controller for compressed air, as will be hereinafter referred to, and Fig. 7, is a section on the line 7—7 of Fig. 6.

Referring to the accompanying drawings, the car body 1 is mounted at each end on a truck, but only one truck needs to be provided with the invention. As will appear hereinafter, a plurality of motor trucks may be simultaneously controlled by a single controller should it be found desirable.

3, 4, 5, 6, are wheels on axles 15, 16, and rolling upon rails 7 and 8.

The truck 2 comprises longitudinal side frames 9 and 10, rigidly connected by truck end sills 11 and 12. Between the axles 15 and 16 is carried the transmission gearing within a casing 13. From this gear casing extend the arms 17, 18, 19 and 20 which are secured to the side frames 9 and 10. Between the arms 17 and 18, on the one hand, and the arms 19 and 20, on the other, extend bars 21 and 22 which strengthen the truck, and also serve to limit the sidewise rocking of the car-body without interfering with the turning of the truck. Within the frames 9 and 10 are formed pedestals in which slide bearing-boxes as 23 and 24, springs 25 and 26 being interposed between the ends of the guide-ways and the bearing-boxes. This permits the frame of the truck to have slight movement with relation to the truck axles for the well known purpose. The gear casing 13 is split horizontally at 28, so as to permit the opening of the casing to insert the apparatus to be contained therein, and also to permit the insertion of the various shafts in their respective bearings. At each end of the gear casing are raised portions, or off-sets, 29 and 30. Upon these off-sets is mounted an explosive engine 37 the lower portion of which is inclosed within crank case 31.

32 is the crank shaft carrying cranks 33, with which the piston-rods 34 of the cylinders are connected in a well known manner. Upon the ends of the crank shaft are located fly-wheels 35 and 36. The crank shaft 32 carries a gear 39 meshing with gear 40 upon a cam shaft 41, having cams 42 adapted to contact with the lower ends of the valve operating and ignition rods 43. The explosive engine may be operated in any of the well known ways, and be constructed in any suitable manner as is well understood, and therefore the details of the engine are not set forth. The crank casing is split on the horizontal plane indicated by 44.

Through the space between the gear casing and the crank casing, which is afforded by reason of the off-sets 29 and 30, extends a body bolster 45 which is secured at its ends to the longitudinal car sills 46 and 47. Bolster 45 is pivoted by pin 48 upon the truck frame, the bolster being provided with a substantially hemispherical protuberance 49 which fits into the concavity in the top of the gear casing which is adapted to receive this protuberance. Also in the concavity in the top of the gear casing is provided a projection 50 surrounding the pin 48 and entering into a circular cavity in the hemispherical portion 49. It will now be apparent that the truck frame and wheels can turn with relation to the bolster 45, and also the car-body can have a slight rocking or lateral movement. The engine and transmission gearing, however, are entirely mounted upon the truck, and maintain their proper relation notwithstanding the movements of the car-body.

The manner of establishing driving connections between the crank shaft of the engine and the wheels of the truck will now be considered. A spur gear 51 is keyed to the crank shaft 32 and meshes with a similar, but larger, gear 52 which is journaled in the wall of the gear casing by means of a pin 53. This gear 52 extends from the interior of the gear casing through an opening 54 in the off-set 29 of that casing. The gear 52 in turn meshes with a gear 55 which is fixed upon a shaft 56 journaled in the gear casing 13. Also fixed to the shaft 56 is a gear 57 meshing with gears as 58 and 59 which turn respectively with the shafts 60 and 61, carried in a support 62 which is rotatable about the shaft 56. Upon the opposite sides of the support 62 from the gears 58 and 59 gears 63 and 64 are fixed upon the shafts 60 and 61 respectively. The last mentioned gears mesh with a spur gear 65 which is fixed to a bevel gear 66. It will be seen that gear 57 is of such length that the support 62, together with the gear 66, can be moved longitudinally without disengaging the gears as 58 and 59 from the gear 57. About the support or drum 62 extends a band 67, having its ends adapted to be drawn together so as to clutch and hold the drum 62, or which may be loosened so as to permit the drum to rotate. When the drum is held against rotation it will be apparent that the turning of gear 57 will result in the turning of gears 58 and 59, the shafts to which they are fixed, the gears 63 and 64, and the bevel gear 66. If, however, the support 62 is not held against rotation the drum, its shafts and the gears which are carried thereby will rotate about the shaft 56, and no power will be transmitted through this gearing.

The support 62 and the bevel gear 66 are mounted upon one end of the sleeve 67' which is slidable longitudinally of the shaft 56. The other end of the sleeve 67 has rotatably mounted upon it a bevel gear 68 which is fixed to a support or plate 69 which is rotatable about the shaft 56 within the drum 70. An internal gear 71 is cut upon the inner face of the drum 70 and with this internal gear mesh planet wheels 72 which are rotatably mounted upon shafts 73, the said shafts being at one end mounted in the plate 69, and at the other end in a plate 74, forming a part of a drum 75 which is rotatably mounted upon the shaft 56. The gears 72 also mesh with a spur gear 76 which is fixed upon the shaft 56, and it will be noted that the gears 72 are of such length with relation to the gear 76 that the gears 72 and their connected apparatus may be slid along the shaft 56 with the sleeve 67. Within the drum 75 (which forms the external member of an internal expansion clutch) and secured upon the plate 74, so as to be radially slidable thereon, are clutch segments 77. The wedge portion 78 secured to a sliding collar 79 serves to push these segments outwardly to engage the drum 75, or outer clutch member, when the wedge 78 is moved to the left, as shown in Fig. 2, while when this wedge is moved to the right in Fig. 2 springs withdraw the clutching segments so as to disengage the clutch in a well known manner. A band 79' surrounding the drum 70 is adapted to be tightened or loosened thereon so as to permit movement, or to stop the drum 70.

The bevel gear 66 is shown as being in engagement with the bevel gear 80, the sleeve 67' being shown as in its right hand position. When the last mentioned sleeve is drawn to the left hand position, the bevel gear 68 will engage with the bevel gear 80.

The sleeve 67' may be thrown in one direction or the other by means of a rod 81 adapted to turn on its axis in the eyes 82 and 83 secured to the gear casing. Fixed to the rod 81 is an arm 84 extending at right angles thereto, the said arm being bifurcated as shown, and having its ends pivoted at 85 and 86 to a collar 87 placed in a groove in the sleeve 67'.

The bevel gear 80 is fixed to a shaft 88 which is journaled in the gear casing. To the other end of the shaft 88 is fixed a spur gear 89 which, through the media of spur gears 90 and 91, drives the gears 92 and 93 which are respectively fixed to the axles of the truck so that these axles and the wheels thereon are driven by the engine in one direction or the other, according to the engagement of gears 80 and 66 or 68.

In the position of the gearing as shown it has been before described how the band 67 may be operated to control the driving of the wheels of the truck. This is the reverse position of the apparatus, that is the position which will be employed in running the car backward. When it is desired to run the car forward the rod 81 is turned upon its axis by a handle or other suitable means, and the sleeve 67' is slid along the shaft 56 until the bevel gear 68 comes into mesh with the bevel gear 80. This, of course, involves the throwing of the gear 66 away from the gear 80 as both the bevel gears 66 and 68 are mounted upon the sleeve 67'. The shaft 56 will now drive the gears 72 through the gear 76 but, the band 79' being released and the expansion clutch being disengaged, no power will be transmitted to the bevel gear 80. If now the band 79' be tightened until the drum 70 is stopped, the planetary gears 72 will travel about the now fixed internal gear upon the inner face of the drum 70 and the bevel gear 80 be turned and the truck wheels will be driven in a forward direction at a certain speed. If now a higher speed be desired, the band 79' may be loosened and the expansion clutch engaged. The drum 75 will then be driven at the same number of revolutions as the shaft 56, and through the shafts 73 the plate 69 will be carried along at the same number of revolutions as the drum 75. With this plate 69 will be carried the bevel gear 68 which will in turn impart the increased speed to the bevel gear 80 and the truck wheels.

In order to secure smooth operation of the clutching devices they are operated by elastic fluid such as compressed air. To this end is provided the air cylinder 90' and its connected mechanism for operating the expansion clutch. This cylinder is mounted upon the gear casing and contains the piston 91', the piston-rod 92' of which carries an arm 93' which engages in a groove in the collar 79, so that the clutch will be engaged or disengaged according to whether or not compressed air is supplied to the cylinder 90'. Similar cylinders 94 and 95 are provided for operating the clutch bands 67 and 79'. A description of the apparatus and operation of one of these clutch bands will apply to each. Referring particularly to Fig. 3, the clutch band 79' has one end 97 held stationary, while its other end 98 is movable and is connected to the piston-rod 99 of the piston 100 within the cylinder 95. It will be apparent that as compressed air is admitted behind the piston 100 through the pipe 102, that the piston will be driven to force the end 98 of the clutch band toward the end 97, and thus tighten the band upon the drum. In a similar manner the admission of compressed air through the pipe 105 will operate to tighten the band 67. To release either of the bands, or the expansion clutch, as the case may be, the space behind the operating piston which contains compressed air may be connected with the atmosphere and the pressure thus removed from the cylinder. Under such conditions the clutch band will naturally tend to release, but if desired springs may be provided to loosen them. Also the expansion clutch being under the condition of no pressure as stated, will be disengaged by the springs which are usually employed in such clutches. An additional spring for moving the piston, or other mechanism for aiding or accelerating the disengagement of the clutch may be employed if desired.

To control the supply of air for operating the expansion clutch, or the clutch bands, a controller may be provided as shown in Figs. 6 and 7. This controller comprises an outer casing 100' within which a plug or valve 101 is rotatably and tightly fitted. The valve incloses a chamber 102' having an opening 103' through which compressed air may be supplied to the interior of the valve from a suitable source of supply. The valve may be turned by a handle 104. The casing is supplied with openings 105', 106 and 107 through which air may be supplied to or exhausted from the different clutch operating cylinders. In the wall of the valve is a port 108 adapted to register successively with the openings 105', 106 and 107. The valve also has a vertical slot 109 in communication with the atmosphere, and extending circumferentially, with the bottom of which communicates another circumferential slot 110 adapted to register with the openings 105', 106 and 107, it being of such circumferential extent that when one of the openings 105', 106 or 107 is in registry with the port 108, the other two are in communication with the atmosphere through the slots 109 and 110 and also when the valve is in "off" position, all the openings 105', 106 and 107 are in communication with the atmosphere. It being assumed that the bevel gears 66 and 80 are in engagement as shown in Fig. 2, they are in position for moving the car backward. It also being assumed, however, that the handle is in the "off" position as shown by the dotted lines of Fig. 7, no power will be transmitted to the truck wheels. If now the handle be thrown to the left until the port 108 is in registry with the opening 107, compressed air will be supplied to the cylinder 94, the band will be tightened upon the drum 62 and power will be transmitted to the wheels to drive the car backward at a speed determined by the controller as before described. The car can be stopped by moving the handle to the "off" position, when the band will be released. Should it now be desired to run the car in a forward direction, the bevel gear 68 would be thrown into mesh with the bevel gear 80 from a separate controller. The handle 104 would then be turned to the right until the openings 108 and 105' were in registry when the band 79' would be tightened and a low forward speed obtained. By turning the handle still farther to the right until the openings 108 and 106 were in registry, the expansion clutch would be thrown into engagement and a higher speed obtained.

To utilize the heat of the engine as hereinbefore referred to, a heater 111 is placed in the compartment of the car to be occupied by passengers. The jacket water of the engine may be supplied to this heater through a pipe 112 controlled by a valve 113. In order that the jacket water may be cooled independently of the heater, a pipe 114 is provided which is controlled by a valve 115. By this pipe 114 the water may be directed to a radiator outside the compartment referred to. By closing one of the valves 113 and 115 and opening the other, the heated water may be directed through the heater or not as desired. If desired the heated exhaust gases might be used for heating in a similar manner.

It will be understood that suitable cooling means in the engine and a fuel supply will be provided, and also a source of air pressure which may be the air brake tank. Where piping is required between parts mounted on the car-body and parts on the truck flexible joints will be provided so as to permit the slight relative movement of the truck and the car-body. It will also be seen that the engine cylinders may be inclosed in a separate casing carried by the truck if desired, and by reason of the low position of the engine, space immediately above in the car-body will be available for other uses, and also the motorman can have free access to the engine while the car is running, should he so desire. Also suitable provision for lubrication will be made.

It will therefore be seen from the foregoing description that I have provided a motor truck having a gasolene engine mounted directly thereon and also a variable speed and reverse transmission gear, controlled by fluid pressure connections from the car-body. By the use of fluid pressure connections it will be seen that ample holding power will be provided for the planetary clutches and the cone clutch, and also ample power for shifting the reverse gear which, of course, will be used relatively infrequently as compared with the two forward speeds. By the use of the variable speed friction gearing herein described the speed changes may be effected without shock and jar or straining the mechanism.

While the invention has been illustrated in what is considered its best application it may be embodied in other structures and is not therefore limited to the structure shown in the drawings.

What I claim is:

1. The combination with a car truck of a gear casing thereon, an engine carried by said truck, said engine being mounted above said gear casing, and a body bolster between said engine and gear casing.

2. The combination with a car truck of a variable speed transmission gear thereon, an engine carried by said truck, said engine being mounted above said transmission, and a body bolster pivoted to said truck and passing between said transmission and said engine.

3. The combination with a wheeled truck, of an explosion engine mounted thereon above the axles, a variable speed transmission between said engine and said axle, and means passing between said engine and said transmission and pivoted on said truck frame for supporting a car-body.

4. The combination with a wheeled truck, of an explosion engine mounted thereon above the axles, a variable speed planetary transmission between the engine shaft and both wheel axles, and a pivoted truck bolster passing beneath said engine and above said transmission for supporting a car-body.

5. The combination with a wheeled truck, of an explosion engine mounted thereon above the axles, a variable speed planetary transmission between the engine shaft and both wheel axles, a pivoted truck bolster passing beneath said engine and above said transmission for supporting a car-body, and means for actuating said transmission from the car-body.

6. The combination with a wheeled truck comprising separated axles and a frame, of an explosion engine mounted thereon, a closed crank shaft casing carried by said truck frame, a variable speed transmission gear between said crank shaft and said axles, a casing inclosing said transmission and carried by the truck frame, and a body bolster pivoted on the truck frame between the engine casing and the transmission gear casing.

In testimony whereof I affix my signature, in presence of two witnesses.

HIRAM P. HALL.

Witnesses:
J. H. WOOSTER,
GEO. N. KERR.